United States Patent [19]
Flora et al.

[11] 4,081,324
[45] Mar. 28, 1978

[54] SPACER CAPTURE ROD TO SPACER GRID ATTACHMENT DEVICE

[75] Inventors: Barney S. Flora; John F. Patterson, both of Richland, Wash.

[73] Assignee: Exxon Nuclear Company Inc., Bellevue, Wash.

[21] Appl. No.: 696,887

[22] Filed: Jun. 17, 1976

[51] Int. Cl.² .............................................. G21C 3/30
[52] U.S. Cl. ........................................ 176/78; 176/76
[58] Field of Search ..................................... 176/76, 78

[56] References Cited

U.S. PATENT DOCUMENTS

| 3,787,286 | 1/1974 | Anthony | 176/78 |
| 3,802,995 | 4/1974 | Fritz et al. | 176/76 |
| 3,984,284 | 10/1976 | Long et al. | 176/78 X |
| 3,994,779 | 11/1976 | Brayman et al. | 176/76 X |

FOREIGN PATENT DOCUMENTS

| 2,023,587 | 11/1970 | Germany | 176/78 |
| 2,156,171 | 7/1972 | Germany | 176/78 |

Primary Examiner—Peter A. Nelson
Attorney, Agent, or Firm—Ronald D. Hantman

[57] ABSTRACT

A system for capturing a grid spacer in a nuclear fuel bundle which comprises a split sleeve fixed to a capture rod. The sleeve is used in conjunction with a grid spacer having openings formed by intersecting walls which include protrusions and coacting springs extending from the walls. The sleeve includes pairs of longitudinally spaced bosses and a standoff boss extending radially outward from the surface of the rod. The pairs of bosses are positioned astride the protrusions from the walls to prevent longitudinal movement of the grid spacer. The split serves as a guide slot to orient the capture rod so that it may pass through the grid spacer openings unencumbered by the protrusions from the grid space walls. The standoff boss is in surface contact with a wall of the grid spacer.

7 Claims, 7 Drawing Figures 4,081,324

SPACER CAPTURE ROD TO SPACER GRID ATTACHMENT DEVICE

BACKGROUND OF THE INVENTION

The present invention relates to nuclear reactor fuel bundles such as are used in reactors of the pressurized water or boiling water type. In such bundles, fissionable fuel is disposed within elongated tubular fuel rods which are mounted in parallel array between a pair of end plates. When the bundle is in service in a nuclear power reactor, water passes along the outer surface of the fuel rods, receiving heat therefrom owing to the reaction occurring inside. In order to permit uniform heat removal and to avoid overheating of the rods, it is necessary that they be accurately spaced apart laterally. Maintaining the spacing of the elongated rods in such a closely spaced array under conditions in which vibration naturally occurs, requires a carefully designed spacer unit which has been the subject of many prior art patents. In particular, the present invention may be used with a spacer of the type described in U.S. Pat. No. 3,852,154 assigned to the assignee of the present invention, which is incorporated by reference into the present application.

In the spacer design of the referenced patent, a corner mounted spring engages the side of fuel rods passing through each of the grid openings formed by the spacer and holds the fuel rod against protrusions which have been formed from the grid walls. This three-point engagement provides a stable positioning of the fuel rod within the spacer. In a typical fuel bundle there are a plurality of spacers disposed along the length of the fuel rod. In order to assure proper positioning during operation, the spacers must be secured in the desired position; otherwise, they may be displaced along the longitudinal direction of the fuel rods due to the vibration and the flow of water adjacent the tubes. Typical prior art devices which perform the function of securing a grid spacer against movement, may be found in British Pat. No. 1,148,881, U.S. Pat. No. 3,802,995, and U. S. application Ser. No. 385,312, now U.S. Pat. No. 3,984,284, assigned to the same assignee as the present invention. None of these prior art devices are considered to include the elements of the present invention. The present invention provides a simple and improved construction to secure the grid spacer in the desired position and which avoids the problems typical of prior art arrangements for securement of these spacers.

SUMMARY OF THE INVENTION

The spacer capture system of the present invention, broadly, includes a spacer capture rod having a guide slot, a pair of longitudinally spaced bosses and a standoff boss extending radially outward from the surface of the rod. The spacer capture rod is used in conjunction with a grid spacer having openings formed by intersecting walls which include protrusions and coacting springs extending from the walls. The guide slot positions the bosses on the rod along a diagonal of the grid spacer opening so that the rod may be inserted into and pass through the opening with the bosses unencumbered by the protrusions from the grid spacer walls. The grid spacer is captured by the capture rod by positioning a protrusion from the grid space walls between the engaging bosses on the rod such that movement of the grid spacer in either longitudinal direction is prevented. The standoff boss is in surface contact with a flat wall of the grid spacer opening.

In the preferred embodiment the bosses are formed on a sleeve fixed to a capture rod. The sleeve is split longitudinally to provide the guide slot. The bosses are formed from the raised lob portions on the sleeve.

The advantages, nature , construction and arrangement and operation of the present invention will be apparent upon consideration of the illustrated embodiments described in detail herein in connection with the accompanying drawings.

DESCRIPTION OF THE PREFERRED EMBODIMENT

Figure 1:
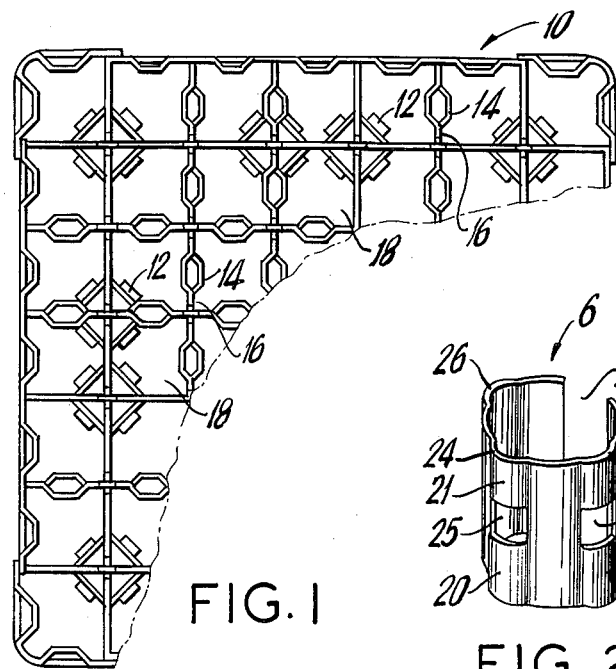
FIG. 1 is a partial plan view of a typical conventional grid spacer used with the capture system of the present invention.

FIG. 1 illustrates in a plan view the type of grid spacer 10 with which the capture system of the present invention is associated. A grid spacer of this type is described and illustrated in more detail in the referenced patent, U.S. Pat. No. 3,852,154. The openings formed from the walls of the grid spacer includes a corner mounted spring 12 unit which engages fuel rods passing through each of the openings 18 and urges the fuel rod against protrusions 14 which are formed from two of the walls 16 defining the grid spacer openings. The other two walls of the grid spacer openings are flat. This three-point contact with a single spring holds the fuel rod securely and minimizes vibrations, and ensures correct positioning of the fuel rod. In an assembled fuel bundle, water which may be flowing at a high velocity through the openings 18 in the grid spacer and vibration of the components of the bundle could cause the grid spacer 10 to move longitudinally with respect to the fuel rods. The capture system of the present invention ensures that the fuel rods remain properly spaced by preventing movement of the grid spacers. The protrusions 14 from the walls of the grid spacer 10 provide not only a means of positioning the fuel rods but also a means of securing the grid spacer in a desired position. This is achieved in the present invention by including in the parallel array of fuel rods a capture rod 30 having a sleeve 6 for engaging the grid spacer 10.

Figure 2:
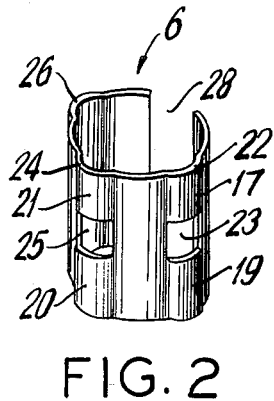
FIG. 2 is a perspective view of the preferred embodiment of the present invention showing the two lobe sections having windows.

FIG. 2 shows a preferred embodiment of the locking sleeve 6 which is generally cylindrical and is fabricated from thin sheet metal. The sleeve is split axially and includes three raised lobes 22, 24 and 26 which are located at 90° increments about the periphery of the sleeve. Windows 23 and 25, i.e. openings, are formed in a center portion of two of the lobes 22 and 24. The remaining portions 17, 19, and 20, 21 on each side of the windows 23 and 25 function as bosses for engaging the protrusions 14 from two of the grid spacer walls. Lobe 26 is of sufficient length to be in surface contact with one of the flat walls forming the grid spacer opening 18 and serves as a standoff boss. The axial split 28 is located at a point opposite the center lobe 25 to provide a guide slot in the longitudinal direction that is aligned with the corner spring 12 when the capture rod is moved longitudinally into position to capture the grid spacer.

Figure 3:
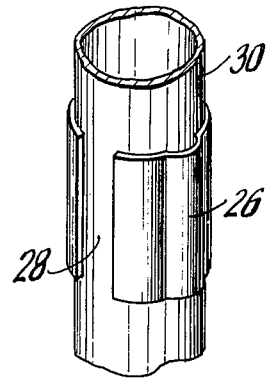
FIG. 3 is a perspective view of the preferred embodiment of the present invention fixed to a section of a capture rod showing the lobe without a window and the guide slot.

FIG. 3 shows the sleeve of FIG. 2 mounted on a portion of a standard fuel rod 30 by welding or other appropriate attachment method. However, in FIG. 3, the sleeve has been rotated relative to the view of FIG. 2 so that the guide slot 28 and the third lobe 26 are more visible. The rod 30 is shown as hollow, although a solid rod will work as well.

Figure 4:
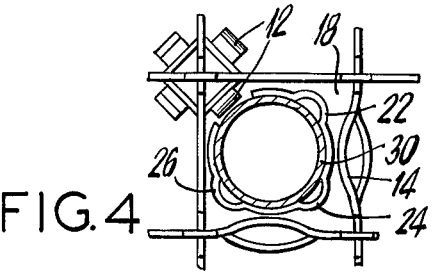
FIG. 4 is an enlarged sectional view of the grid spacer of FIG. 1 combined with the present invention illustration the spacer capture system disengaged.
Figure 5:
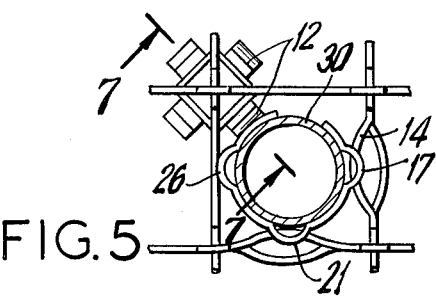
FIG. 5 is a view corresponding to FIG. 4 in which the spacer capture system of the present invention is engaged.
Figure 7:
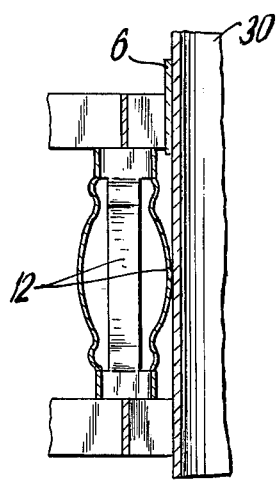
FIG. 7 is a sectional view taken substantially along 7—7 of FIG. 5.
Figure 6:
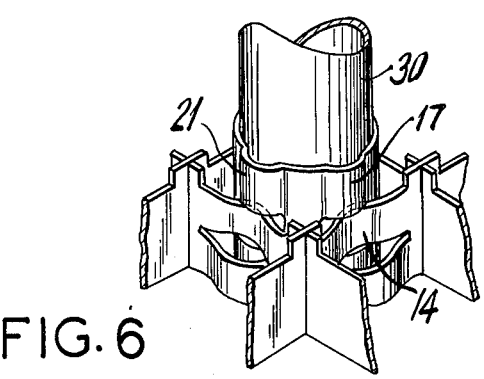
FIG. 6 is a perspective view of the engaged spacer capture system of FIG. 5.

FIG. 4 shows a cross section of the capture rod (standard fuel rod plus sleeve) within the grid spacer opening 18 in the disengaged position. The spring 12 is pressed against the outer diameter of the fuel rod 30. The guide slot 28 is aligned with the spacer grid corner spring 12 so that the spring 12 will pass through the guide slot as the capture rod slides into position to capture the grid spacer. The guide slot 28 positions the sleeve lobes 22, 24, and 26, diagonally with the grid spacer opening 18 so that the capture rod may slide through the opening 18 unencumbered by the protrusions 14. The capture rod is longitudinally positioned within the grid spacer opening 18 so that the bosses 19 and 20 and windows 23 and 25 of each of the lobes 22 and 24 are within the opening 18 formed from the walls of the grid spacer. The protrusions 14 on the grid spacer walls are aligned with the windows 23 and 25 and enter the windows when the capture rod is rotated 90° about its axis. The bosses 17, 19 and 20, 21 of the lobes 22 and 24 on either side of the windows 23 and 25 are then positioned on either side of protrusions 14 and prevent the spacer from moving in either longitudinal direction. The lobe 26 without a window presses against a flat wall of the grid spacer that lacks a protrusion 14. The corner spring 12 is below the collar 6 and presses against the outer diameter of the rod 30 (see FIG. 7). FIG. 5 shows a cross section of the capture system in the locked position. FIG. 6 shows a perspective view of the capture system in the locked position. Because of windows in only two of the lobes in the preferred embodiment, the sleeve 6 only allows for rotation of the capture rod in one direction about its longitudinal axis in order to capture the grid spacer. However, if it is desirable to allow for rotation of the capture rod in either direction, lobe 26 may also include a window similar to lobes 22 and 24.

The foregoing description of the preferred embodiment is for information and illustration only, and should not be taken as limiting the scope of the invention which is defined by the claims which follow.

What is claimed is:

1. In a nuclear fuel bundle having a parallel array of fuel rods and at least one spacer capture rod which longitudinally extend through openings formed from intersecting walls of a grid spacer, some of said walls being flat and others of said walls having protrusions extending into said openings and coacting springs for holding said fuel rods in laterally fixed positions, a spacer capture system which secures said grid spacer in fixed position comprising a sleeve fixed to said space capture rod, said sleeve including:
  (a) a guide slot; and
  (b) a pair of engaging bosses extending radially outward from and mounted longitudinally apart on said sleeve for engaging one of said protrusions from said grid spacer walls between said pair of bosses such that movement of said grid space in either longitudinal direction is prevented; and
  (c) a standoff boss extending radially from said sleeve and of sufficient length to be disposed in surface contact with said flat spacer grid wall.

2. The spacer capture system of claim 1 wherein said sleeve includes an axial split to provide said guide slot.

3. The spacer capture system of claim 1 wherein said standoff boss is circumferentially spaced from said engaging bosses.

4. The spacer capture system of claim 2 wherein said sleeve includes a raised lobe having an opening in a central portion of said lobe.

5. The spacer capture system of claim 3 wherein said sleeve includes a second raised lobe having an opening in a central portion of said second lobe.

6. The spacer capture system of claim 4 wherein the said sleeve includes a third raised lobe on said sleeve.

7. In a nuclear fuel bundle having a parallel array of fuel rods which longitudinally extend through openings formed from intersecting walls of a grid spacer, some of said walls being flat and others of said walls having protrustions extending into said openings and coacting springs for holding said fuel rods in laterally fixed positions, a spacer capture system which secures said grid spacer in fixed position comprising:
  (a) a spacer capture rod; and
  (b) a sleeve having a longitudinal split and including three radial lobes fixed to said capture rod, said split and each of said three lobes located at 90° increments about the periphery of said sleeve, two of said lobes having a central window for engaging said protrusions.

* * * * *